United States Patent
Takemura

(12) 
(10) Patent No.: US 11,136,657 B2
(45) Date of Patent: Oct. 5, 2021

(54) ALUMINUM ALLOY PLASTIC WORKED ARTICLE, METHOD FOR MANUFACTURING THE SAME, AND AUTOMOBILE COMPONENT

(71) Applicant: SHOWA DENKO K.K., Tokyo (JP)

(72) Inventor: Hideki Takemura, Kitakata (JP)

(73) Assignee: SHOWA DENKO K.K., Tokyo (JP)

( * ) Notice: Subject to any disclaimer, the term of this patent is extended or adjusted under 35 U.S.C. 154(b) by 17 days.

(21) Appl. No.: 16/436,051

(22) Filed: Jun. 10, 2019

(65) Prior Publication Data

US 2019/0330726 A1     Oct. 31, 2019

Related U.S. Application Data

(62) Division of application No. 15/025,297, filed as application No. PCT/JP2015/054188 on Feb. 10, 2015, now abandoned.

(51) Int. Cl.
   *C22F 1/047*    (2006.01)
   *C22F 1/043*    (2006.01)
   (Continued)

(52) U.S. Cl.
   CPC ............ *C22F 1/047* (2013.01); *B22D 21/007* (2013.01); *B60G 7/001* (2013.01); *C22C 21/02* (2013.01); *C22C 21/08* (2013.01); *C22F 1/04* (2013.01); *C22F 1/043* (2013.01); *C22F 1/05* (2013.01); *B60G 2206/10* (2013.01); *B60G 2206/124* (2013.01); *B60G 2206/7101* (2013.01); *B60G 2206/7102* (2013.01)

(58) Field of Classification Search
   None
   See application file for complete search history.

(56) References Cited

U.S. PATENT DOCUMENTS

| | | |
|---|---|---|
| 2009/0000705 A1 | 1/2009 | Nakai et al. |
| 2013/0032255 A1 | 2/2013 | Hori et al. |

FOREIGN PATENT DOCUMENTS

| | | |
|---|---|---|
| JP | 2000-144296 A | 5/2000 |
| JP | 2001-107168 A | 4/2001 |

(Continued)

OTHER PUBLICATIONS

Communication dated Sep. 6, 2016, from the Japanese Patent Office in counterpart Japanese application No. 2015-552667.

(Continued)

*Primary Examiner* — Anthony M Liang
(74) *Attorney, Agent, or Firm* — Sughrue Mion, PLLC

(57) ABSTRACT

An aluminum alloy plastic worked article including a plastic worked portion formed of a thinned portion 22 formed by plastic working and rib portions 21 formed at two ends of this thinned portion 22 having an approximately H-shaped or U-shaped cross-section. The plastic worked portion is a plastic worked portion 2 having strain portions 23 in each of which an equivalent strain of up to 4.0 mm/mm generated by plastic working is present, and the strain portions 23 are each located in the vicinity of the surface of the plastic worked portion 2 at a boundary between the thinned portion 22 and each of the rib portions 21 and are each formed of a non-recrystalline texture N of aluminum which is not recrystallized or formed of the non-recrystalline texture N and a fine crystalline texture M which is recrystallized but has a crystal grain of 500 μm or less.

3 Claims, 10 Drawing Sheets

(51) Int. Cl.
*C22F 1/04* (2006.01)
*C22F 1/05* (2006.01)
*B22D 21/00* (2006.01)
*B60G 7/00* (2006.01)
*C22C 21/02* (2006.01)
*C22C 21/08* (2006.01)

(56) References Cited

FOREIGN PATENT DOCUMENTS

| | | |
|---|---|---|
| JP | 2004-43907 A | 2/2004 |
| JP | 2008-163445 A | 7/2008 |
| JP | 2014-81310 A | 5/2014 |
| WO | 2011/122263 A1 | 10/2011 |
| WO | 2011/129431 A1 | 10/2011 |

OTHER PUBLICATIONS

International Search Report for PCT/JP2015/054188 dated May 26, 2015.
Machine translation of JP application No. 2008-163445A published Jul. 17, 2008.

11

12

ALUMINUM ALLOY PLASTIC WORKED ARTICLE, METHOD FOR MANUFACTURING THE SAME, AND AUTOMOBILE COMPONENT

This application is a divisional of U.S. application Ser. No. 15/025,297 filed Mar. 28, 2016, which is a National Stage of International Application No. PCT/JP2015/054188, filed Feb. 10, 2015, the entire content of which is incorporated herein by reference.

TECHNICAL FIELD

The present invention relates to an aluminum alloy plastic worked article manufactured from an ingot of an Al—Mg—Si-based aluminum alloy, a method for manufacturing the same, and an automobile component.

BACKGROUND ART

In recent years, aluminum alloy plastic worked articles manufactured from ingots of Al—Mg—Si-based aluminum alloys have been used as structural materials (components) of transport apparatuses, such as vehicles, boats and ships, aircrafts, automobiles, or two-wheeled motor vehicles. The reason for this is that the Al—Mg—Si-based aluminum alloy has excellent workability and a high strength and also has corrosion resistance.

For example, A6061, which is one type of Al—Mg—Si-based aluminum alloy, has been frequently used for automobile components, such as a suspension arm. However, in order to reduce the weight of a vehicle body, a material lighter than A6061 has been requested. In order to respond to this request, the reduction in required alloy amount has been attempted through an increase in strength of the Al—Mg—Si—based aluminum alloy.

For example, in order to increase the strength of the Al—Mg—Si-based aluminum alloy, an attempt in which an excessive amount of Si is used or in which the addition amount of a Cu element is increased has been performed. In particular, since the increase in addition amount of a Cu element promotes the precipitation of $Mg_2Si$, the strength is improved, and since a Cu element is solid-soluted in the matrix, the strength is improved; hence, the increase in addition amount of a Cu element may be probably an effective way to increase the strength. However, when the Cu element amount is 0.05% or more, since the sensibility to grain-boundary corrosion is increased, if the Al—Mg—Si-based aluminum alloy is used under corrosive environment, stress corrosion cracks may be generated in some cases.

As one related technique, a technique has been known in which when the crystal grain diameter or the size of crystallized materials is decreased by addition of a transition element, such as chromium, manganese, or zirconium, the grain-boundary corrosion and the stress corrosion cracks are prevented, and the corrosion resistance of the Al—Mg—Si-based aluminum alloy is improved.

For example, in order to provide a high-strength and high-toughness aluminum alloy forged material, the following has been disclosed in the below Patent Literature 1.

In an aluminum alloy forged material which contains 0.6% to 1.6% (percent by mass, hereinafter "%" indicates the same) of Mg, 0.6% to 1.8% of Si, and 0.05% to 1.0% of Cu; which controls Fe to have a content of 0.30% or less; which contains one type or at least two types of 0.15% to 0.6% of Mn, 0.1% to 0.2% of Cr, and 0.1% to 0.2% of Zr; which further sets the content of hydrogen to 0.25 cc/100 g of Al or less; and which contains the balance including Al and inevitable impurities, after an aluminum alloy ingot casted at a cooling rate of 10° C./sec or more is processed by a homogenizing heat treatment at a temperature of 530° C. to 600° C., a forged material is formed by hot forging so that the total area rate of $Mg_2Si$ and an Al—Fe—Si—(Mn,Cr,Zr)-based crystallized material in an aluminum alloy texture of the forged material is set to 1.5% or less per unit area.

In addition, in order to provide an aluminum alloy forged material having not only a high strength and a high toughness but also superior corrosion resistance and durability, the following has been disclosed in the below Patent Literature 2.

In an aluminum alloy forged material which contains 0.6% to 1.8% (percent by mass, hereinafter "%" indicates the same) of Mg and 0.6% to 1.8% of Si; which further contains one type or at least two types of 0.1% to 0.2% of Cr and 0.1% to 0.2% of Zr; which control Cu, Mn, Fe, and hydrogen to have contents of 0.25% or less, 0.05% or less, 0.30% or less, and 0.25 cc/100 g of Al or less, respectively; and which contains the balance including Al and inevitable impurities, the average grain diameter of $Mg_2Si$ and Al—Fe—Si—(Mn,Cr,Zr)-based crystal precipitates (crystallized materials and precipitates) present on grain boundaries of an aluminum alloy texture is set to 1.2 μm or less, and the average distance between those crystal precipitates is also set to 3.0 μm or more.

When the crystal grain diameter and the size of crystallized materials are decreased, those Al—Mg—Si-based aluminum alloy raw materials have functions to prevent the grain-boundary corrosion and to suppress the generation of stress corrosion crack. However, since an increase in addition amount of a Cu element degrades the corrosion resistance, the corrosion weight loss generated thereby cannot be suppressed. Hence, when the weight of a plastic worked article formed from at least one of those Al—Mg—Si-based aluminum alloy raw materials is reduced by reduction in thickness thereof, the strength is surely decreased corresponding to the thickness reduced by the corrosion weight loss, and the durability is degraded. That is, there has been a problem in that those Al—Mg—Si-based aluminum alloy raw materials are not suitably used in a severe corrosive environment.

In addition, even by a strength member forged material in which the strength is increased by an increase in alloy element amount and in which the thickness is reduced, in order to provide a 6000 series aluminum alloy forged material which can stably obtain a 0.2%-proof stress of 350 MPa or more and to provide a forging raw material, the following has been disclosed in the below Patent Literature 3.

In an aluminum alloy forged material which contains 0.6% to 1.8% (percent by mass, hereinafter "%" indicates the same) of Mg, 0.8% to 1.8% of Si, and 0.2% to 1.0% of Cu, the mass ratio of Si/Mg being 1 or more; which further contains one type or at least two types of 0.1% to 0.6% of Mn, 0.1% to 0.2% of Cr, 0.1% to 0.2% of Zr; and which contains the balance including Al and inevitable impurities, the electrical conductivity of the surface of the aluminum alloy forged material after an artificial age hardening treatment is set to 41.0 to 42.5 IACS %.

PRIOR ART DOCUMENTS

Patent Literature

PTL 1: Japanese Unexamined Patent Application Publication No. 2000-144296

PTL 2: Japanese Unexamined Patent Application Publication No. 2001-107168
PTL 3: Japanese Unexamined Patent Application Publication No. 2004-43907

SUMMARY OF INVENTION

Problem to be Solved by the Invention

The present inventors found that the form of a recrystalline texture of aluminum generated by performing a solution treatment on an aluminum alloy to which a working strain is applied by plastic working has influences on various performances in terms of, for example, the strength, the proof stress, and the elongation of an Al—Mg—Si-based aluminum alloy plastic worked article. That is, it is being found that when aluminum is made by a solution treatment to have the form of a coarse and large recrystalline texture in which aluminum is recrystallized in a coarse and large manner, the various performances in terms of, for example, the strength, the proof stress, and the elongation of an Al—Mg—Si-based aluminum alloy plastic worked article tend to decrease. In addition, it is also being found that when the texture state of an aluminum alloy raw material in casting is maintained even after a working strain is applied thereto, various preferable performances in terms of, for example, the strength, the proof stress, and the elongation can be obtained.

Furthermore, the present inventors also discovered that the presence and the type of precipitates of chromium, manganese, iron, and the like, which are transition metals contained in an Al—Mg—Si-based aluminum alloy raw material, have influences on the recrystallization of aluminum. The reason for this is that the movement of grain boundaries which occurs during recrystallization of aluminum is influenced, that is, for example, the above movement is disturbed by the precipitates of those transition metals.

The present invention has been proposed in consideration of the actual situation described above and relates to an Al—Mg—Si-based aluminum alloy plastic worked article which can obtain preferable performances in terms of, for example, the strength, the proof stress, and the elongation by forming and maintaining a preferable aluminum texture state even if a solution treatment is performed after a working strain is applied. In addition, the present invention aims to provide an Al—Mg—Si-based aluminum alloy plastic worked article which can improve not only the strength but also the corrosion resistance and can surely realize the reduction in weight by reduction in its thickness, a method for manufacturing the above plastic worked article, and an automobile component.

Solution to Problem

In order to achieve the aim described above, the present invention relates to an aluminum alloy plastic worked article including a plastic worked portion which is formed of a thinned portion formed by plastic working and rib portions formed at two ends of this thinned portion and which has an approximately H-shaped or U-shaped cross-section. The above aluminum alloy plastic worked article is characterized in that the plastic worked portion described above has strain portions in each of which an equivalent strain of up to 4.0 mm/mm generated by plastic working is present, the strain portions are each located in the vicinity of the surface of the plastic worked portion at a boundary between the thinned portion and each of the rib portions, and the strain portion are each formed of a non-recrystalline texture of aluminum (atomic symbol: Al) which is not recrystallized or are each formed of the non-recrystalline texture and a fine crystallized texture of the aluminum which is recrystallized but has crystal grains of 500 μm or less.

The aluminum alloy plastic worked article is characterized in that the composition thereof contains 0.15 to 0.5 percent by mass of copper (atomic symbol: Cu), 0.8 to 1.15 percent by mass of magnesium (atomic symbol: Mg), 0.95 to 1.15 percent by mass of silicon (atomic symbol: Si), 0.4 to 0.6 percent by mass of manganese (atomic symbol: Mn), 0.2 to 0.3 percent by mass of iron (atomic symbol: Fe), 0.11 to 0.19 percent by mass of chromium (atomic symbol: Cr), 0.25 percent by mass or less of zinc (atomic symbol: Zn), 0.05 percent by mass or less of zirconium (atomic symbol: Zr), 0.012 to 0.035 percent by mass of titanium (atomic symbol: Ti), 0.0001 to 0.03 percent by mass of boron (atomic symbol: B), and the balance including aluminum and inevitable impurities, and when a width direction length of the rib portion is represented by x (cm), a height direction length of the thinned portion is represented by y (cm), and a height direction length of the rib portion is represented by z (cm), the content (percent by mass) of the manganese satisfies the following equation [Eq. 1].

$$\text{Manganese (percent by mass)} = 0.4\alpha\{z/(x+y)+0.25\} \quad \text{[Eq. 1]}$$

In the above equation, $z/(x+y) \geq 0.65$ and $\alpha = 0.8$ to $0.9$ hold.

In addition, the aluminum alloy plastic worked article described above is characterized by being an automobile component.

Furthermore, the present invention relates to a method for manufacturing an aluminum alloy plastic worked article which manufactures the aluminum alloy plastic worked article described above, and the method described above is characterized in that after melting/casting is performed, a homogenizing treatment and plastic working are performed on a cast product obtained by the above melting/casting, and subsequently, a solution treatment, a water quenching treatment, and an artificial age hardening treatment are performed.

The artificial age hardening treatment described above is characterized in that an aging treatment temperature is 170° C. to 210° C., and an aging treatment time is 0.5 to 18 hours.

The solution treatment described above is characterized in that a solution treatment temperature is 520° C. to 560° C., and the water quenching treatment described above is characterized in that a water quenching treatment temperature is 70° C. or less.

The plastic working described above is characterized in that at least one type selected from extruding, forging, and rolling is used.

In addition, the present invention is characterized by being obtained using the method for manufacturing an aluminum alloy plastic worked article described above.

Advantageous Effects of Invention

Since the aluminum alloy plastic worked article according to the present invention forms and maintains a preferable aluminum texture state even when a solution treatment is performed after a working strain is applied by plastic working, preferable performances in terms of, for example, the strength, the proof stress, and the elongation can be obtained. In particular, preferable performances, that is, a tensile strength of 380 MPa or more, a 0.2%-proof stress of 350 MPa or more, and an elongation of 10.0% or more, can be obtained. In addition, when immersion is performed in a predetermined corrosive liquid, cracks and the like are not confirmed, and hence, the corrosion resistance is excellent. Since the strength is increased, the corrosion resistance is improved, and the thickness can be reduced, a required alloy amount is reduced, and the reduction in weight can be surely achieved. Hence, the range of application of the Al—Mg—Si-based aluminum alloy plastic worked article can be expanded, and for example, the plastic worked article described above can be preferably used for an automobile component as a transport apparatus application in which the reduction in weight is aggressively pursued.

BRIEF DESCRIPTION OF DRAWINGS

FIG. 1(a) is a schematic explanation view showing the appearance of a so-called linear arm, and FIG. 1(b) is a schematic explanation view showing the appearance of a so-called A arm.

FIG. 2(a) is a schematic explanation view illustrating a suspension arm having an approximately H-shaped cross section, and FIG. 2(b) is a schematic explanation view illustrating a suspension arm having an approximately U-shaped cross section.

DESCRIPTION OF EMBODIMENTS

Hereinafter, an embodiment relating to an aluminum alloy plastic worked article according to the present invention will be described with reference to the drawings. The embodiment described below relates to a suspension arm which is one example of the present invention. The present invention may be variously changed in design as long as without departing from the scope described in the claims.

Figure 1A:
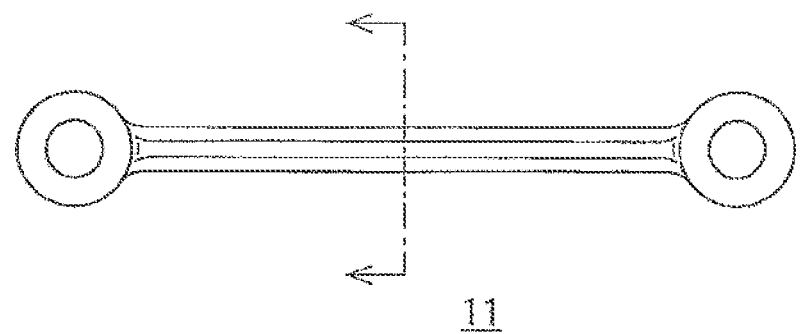
FIGS. 1(a) and 1(b) include explanation views each schematically showing the appearance of a suspension arm which is one example of an aluminum alloy plastic worked article according to the present invention.
Figure 1B:
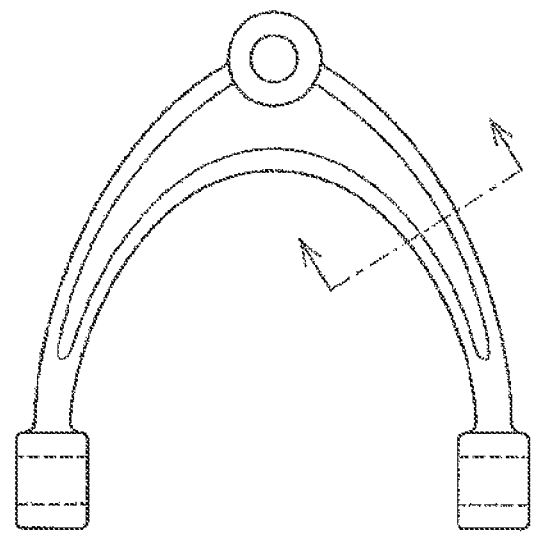
Figure 2A:
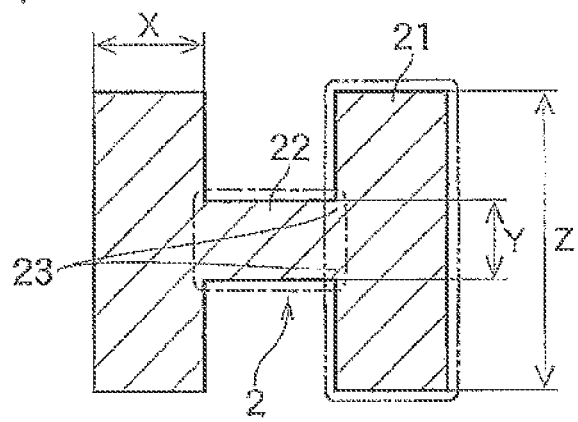
FIGS. 2(a) and 2(b) include explanation views each schematically showing a vertical cross section of the suspension arm which is one example of the aluminum alloy plastic worked article according to the present invention.
Figure 2B:
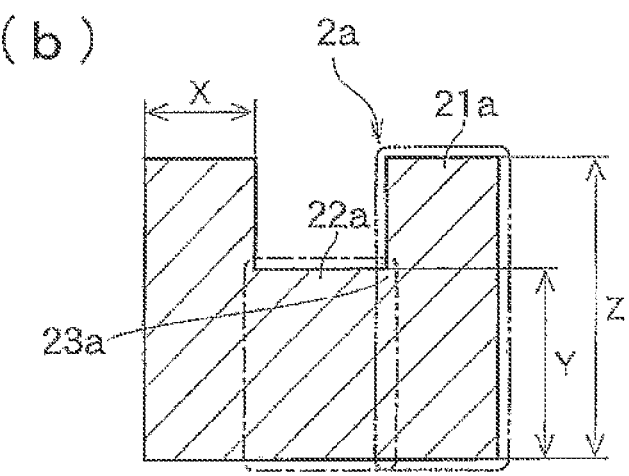

The present invention relates to, for example, an aluminum alloy plastic worked article which is to be applied to a suspension arm or the like, such as a so-called linear arm 11 having a straight bar shape or a so-called A arm 12 having the shape similar to that of alphabet A, each of which is an automobile component, as shown in FIG. 1(a) or 1(b), respectively. As shown in FIG. 2(a), the aluminum alloy plastic worked article according to the present invention is formed to have a plastic worked portion 2 which has an approximately H-shaped cross section and which is formed of rib portions 21 functioning as the two end portions of this approximately H shape and a thinned portion 22 functioning as a connection portion connecting those rib portions 21. In addition, as shown in FIG. 2(b), an aluminum alloy plastic worked article formed to have a plastic worked portion 2a which is formed of rib portions 21a and a thinned portion 22a and which has an approximately U-shaped cross section is also included in the technical scope of the patented invention.

The aluminum alloy plastic worked article according to the present invention is manufactured by performing melting/casting on an aluminum alloy raw material having a predetermined composition, performing a homogenizing treatment and plastic working on a cast product obtained by the melting/casting, and then performing a solution treatment, a water quenching treatment, and an artificial age hardening treatment.

By the plastic working performed on the cast product, the thinned portion 22 is formed. Since the thinned portion 22 is formed, the rib portions 21 are formed at the two ends of this thinned portion 22. That is, the plastic worked portion 2 of the aluminum alloy plastic worked article according to the present invention is formed by plastic working to have an approximately H shape or an approximately U shape when viewed in cross section. In addition, the approximately H shape or the approximately U shape is a shape superior to that of an aluminum alloy having a circular cross section or a rectangular cross section in terms of the flexural rigidity or the flexural strength per weight, which is called a cross-sectional efficiency.

The aluminum alloy plastic worked article according to the present invention has in this plastic worked portion 2, strain portions 23 each having an equivalent strain of up to 4.0 mm/mm as a working strain generated by plastic working. This strain portion 23 is located in the vicinity of the surface of the plastic worked portion 2 at a boundary between the thinned portion 22 and the rib portion 21 (in FIG. 2(b), the strain portion is represented by reference numeral 23a). The equivalent strain is also called an effective strain and indicates the strain value calculated to evaluate the intensity of plastic deformation received under a general multi-axial strain condition for comparison purpose. As for the amount of increase in strain generated in an infinitesimal time during deformation, the amount of increase in equivalent strain is defined based on the way of thinking similar to that of the equivalent stress, and this amount of increase in equivalent strain is integrated to obtain the equivalent strain. In general, it has been considered that the work hardening and the change in deformation resistance of a material are each determined by the equivalent strain.

Figure 3:
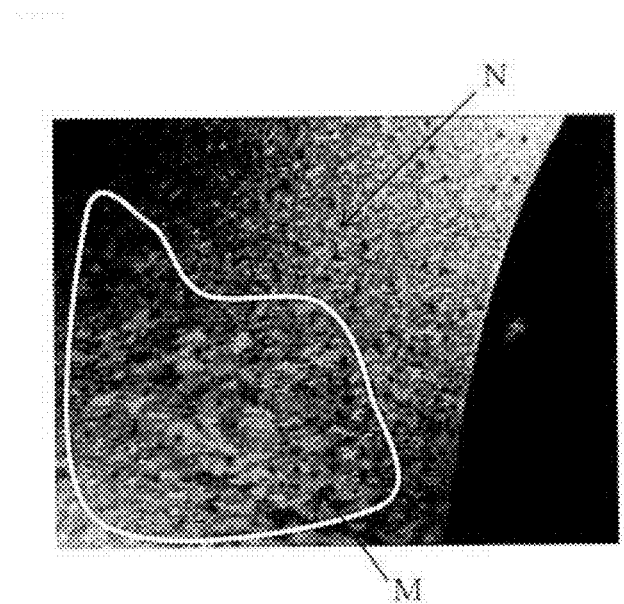
FIG. 3 is a microscope photo relating to an important portion (strain portion) of the aluminum alloy plastic worked article according to the present invention and showing a texture state formed of a non-recrystalline texture and a fine recrystalline texture.

As shown in FIG. 3, even when the plastic working is performed, and the solution treatment is performed after the working strain is applied, the strain portion 23 has a non-recrystalline texture N in which no recrystallization of aluminum (atomic symbol: Al) occurs. In addition, when the plastic working is performed, and the solution treatment is performed after the working strain is applied, the strain portion 23 has a fine crystalline texture M of crystal grains having a maximum diameter (maximum length) of 500 μm or less which is formed by recrystallization of aluminum. The grain diameter of the crystal grains forming the non-recrystalline texture N is 1 to ½ times that of the crystal grains forming the fine crystalline texture M. The inside of the black frame shown in FIG. 3 indicates the fine crystalline texture M and the outside of the black frame indicates the non-recrystalline texture N.

That is, the strain portion 23 is formed of the non-recrystalline texture N and the fine crystalline texture M. By the texture structure as described above, the aluminum alloy plastic worked article according to the present invention has various excellent performances in terms of, for example, the strength, the proof stress, and the elongation as described below. In addition, the non-recrystalline texture indicates a texture in which crystals generated when melting/casting is performed on an aluminum alloy raw material are allowed to remain without being recrystallized. In FIG. 3, the presence of crystallized materials at the grain boundaries is recognized. An aluminum alloy plastic worked article according to the present invention in which the strain portion 23 is only formed of the non-recrystalline texture N also has various excellent performances in terms of, for example, the strength, the proof stress, and the elongation and is included in the technical scope of the patented invention.

Figure 4:
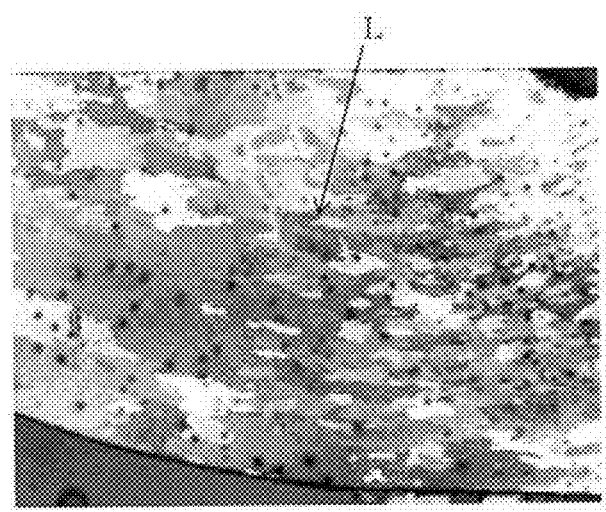
FIG. 4 is a microscope photo showing that in an aluminum alloy plastic worked article of a reference example, the texture state of a portion to which a working strain is applied is a coarse and large recrystalline texture.

In addition, the recrystallization indicates crystals generated at a portion to which a working strain is applied by performing a solution treatment. As a reference example, FIG. 4 shows a microscope photo in which at a portion to which a working strain is applied, aluminum is recrystallized in coarse and large manner by a solution treatment, and a texture form called a coarse and large recrystalline texture L is formed. The grain diameter of crystal grains forming the coarse and large recrystalline texture L is 10 to 50 times that of the crystal grains forming the non-recrystalline texture N. As described below, an Al—Mg—Si-based aluminum alloy plastic worked article having the texture form as described above is inferior to the aluminum alloy plastic worked article according to the present invention in performances, such as the strength, the proof stress, and the elongation.

In addition, the coarse and large recrystalline texture L is also not preferable in terms of the corrosion resistance. Since the grain-boundary corrosion progresses along the grain boundaries, as the crystal grains are courser and larger, deep notches are formed by the corrosion. That is, the corrosion weight loss is increased.

Hence, the aluminum alloy plastic worked article according to the present invention includes the form in which the strain portion 23 is only formed of the non-recrystalline texture N of aluminum which is not recrystallized. Furthermore, the aluminum alloy plastic worked article according to the present invention includes the form in which the strain portion 23 is formed of this non-recrystalline texture N and the fine crystalline texture M of aluminum which is recrystallized to have a maximum crystal grain diameter of 500 μm or less.

The reason the strain portion 23 of the aluminum alloy plastic worked article according to the present invention is formed of the non-recrystalline texture N and the fine crystalline texture M as shown in FIG. 3 is believed as described below.

The reason the non-recrystalline texture N is formed in the strain portion 23 is that the crystal grain boundaries of aluminum are fixed by pinning with fine precipitates of transition metals, such as chromium, manganese, and iron, contained in the composition of the aluminum alloy plastic worked article according to the present invention. Accordingly, the crystal grain boundaries of aluminum cannot be moved even by a solution treatment, and the crystals generated in casting are allowed to remain without being recrystallized. When the working strain amount of aluminum of the strain portion 23 is a predetermined amount or less (for example, an equivalent strain of 4.0 mm/mm or less), the crystal grain boundaries of aluminum are surely fixed by pinning.

The reason the fine crystalline texture M is formed in the strain portion 23 is that the movement of the crystal grain boundaries of aluminum are suppressed by pinning with fine precipitates of the transition metal systems, such as chromium, manganese, and iron, contained in the composition of the aluminum alloy plastic worked article according to the present invention. Accordingly, the crystal grain boundaries of aluminum are suppressed from moving even by a solution treatment, and even when recrystallization is performed, the maximum diameter of the crystal grains is controlled to be 500 μm or less. Furthermore, in the case of an aluminum alloy plastic worked article having a significantly excellent various performances in terms of, for example, the strength, the proof stress, and the elongation and having a preferable structure, the maximum diameter of recrystallized crystal grains of aluminum is 100 μm. That is, coarse and large crystal grains are not formed.

In the composition of the aluminum alloy plastic worked article according to the present invention, when the working strain amount of aluminum of the strain portion 23 is a predetermined amount or less, in particular, when the working strain amount is 4.0 mm/mm or less as the equivalent strain, the crystal grain boundaries of aluminum are pinned, and the suppression of the movement thereof can be confirmed. The size (grain diameter) of the crystal grains can be measured, for example, by a section method performed on an optical microscope photo.

The aluminum alloy plastic worked article according to the present invention is an Al—Mg—Si-based aluminum alloy. The composition thereof contains 0.15 to 0.5 percent by mass of copper (atomic symbol: Cu), 0.8 to 1.15 percent by mass of magnesium (atomic symbol: Mg), 0.95 to 1.15 percent by mass of silicon (atomic symbol: Si), 0.4 to 0.6 percent by mass of manganese (atomic symbol: Mn), 0.2 to 0.3 percent by mass of iron (atomic symbol: Fe), 0.11 to 0.19 percent by mass of chromium (atomic symbol: Cr), 0.25 percent by mass or less of zinc (atomic symbol: Zn), 0.05 percent by mass or less of zirconium (atomic symbol: Zr), 0.012 to 0.035 percent by mass of titanium (atomic symbol: Ti), and 0.0001 to 0.03 percent by mass of boron (atomic symbol: B), and the balance includes aluminum and inevitable impurities.

Si coexists with Mg to form a magnesium silicide-based (composition formula: $Mg_2Si$) precipitate and contributes to improve the strength of a final product. When Si is excessively added in an amount more than that required to form $Mg_2Si$ with respect to the amount of Mg which will be described later, the strength of a final product obtained after an aging treatment is further increased; hence, the content of Si is preferably 0.95 percent by mass or more. On the other hand, when the content of Si is more than 1.15 percent by mass, the amount of grain boundary precipitation of Si is increased, and the grain boundary embrittlement is liable to occur, so that the plastic workability of an ingot and the toughness of a final product may be degraded in some cases. In addition, when the content of Si is more than 1.15 percent by mass, the average grain diameter of crystallized materials of the ingot may exceed a predetermined upper limit. Hence, the content of Si is preferably set to a range of 0.95 to 1.15 percent by mass.

Mg coexists with Si to form a $Mg_2Si$-based precipitate and contributes to improve the strength of a final product. When the content of Mg is less than 0.8 percent by mass, the effect of precipitation strengthening may be decreased in some cases. On the other hand, when the content of Mg is more than 1.15 percent by mass, the plastic workability of an ingot and the toughness of a final product may be degraded in some cases. In addition, when the content of Mg is more than 1.15 percent by mass, the average grain diameter of crystallized materials of the ingot may exceed a predetermined upper limit. Hence, the content of Mg is preferably set to a range of 0.8 to 1.15 percent by mass.

Since Cu increases an apparent supersaturated amount of a $Mg_2Si$-based precipitate and also increases the amount of a $Mg_2Si$ precipitate, the age hardening of a final product is significantly promoted. When the content of Cu is more than 0.5 percent by mass, the forging workability of an ingot and the toughness of a final product may be degraded, and furthermore, the corrosion resistance may be degraded in some cases. Hence, the content of Cu is required to be set to a range of 0.5 percent by mass or less. On the other hand, when the content of Cu is less than 0.15 percent by mass, the effect of increasing the apparent supersaturated amount of a $Mg_2Si$-based precipitate and also increasing the amount of a $Mg_2Si$ precipitate may not be sufficiently obtained in some cases.

Mn is crystallized in the form of an AlMnSi phase, and Mn which is not crystallized is precipitated to suppress recrystallization. By this effect of suppressing recrystallization, the size of crystal grains can be decreased even after plastic working, and as a result, the effect of improving the toughness and the corrosion resistance of a final product can be obtained. When the content of Mn is less than 0.4 percent by mass, the effect as described above may be decreased in some cases. On the other hand, when the content of Mn is more than 0.6 percent by mass, a giant intermetallic compound is generated, and the ingot texture of the present invention may not be satisfied in some cases. Hence, the content of Mn is preferably set to a range of 0.4 to 0.6 percent by mass.

In particular, the content of Mn (percent by mass) is 0.4 to 0.6 percent by mass. Furthermore, when a width direction length of the rib portion 21 is represented by x (cm), a height direction length of the thinned portion 22 is represented by y (cm), and a height direction length of the rib portion 21 is represented by z (cm) (see the cross-sectional shape of the plastic worked portion 2 shown in FIGS. 2(*a*) and (*b*) by way of example), the following equation [Eq. 2] is satisfied. When the content of Mn is set as described above, by the transition metal-based fine precipitates, the effect of pinning the crystal grain boundaries of aluminum and suppressing recrystallization can be preferably obtained.

$$Mn(\text{percent by mass}) = 0.4\alpha\{z/(x+y)+0.25\} \qquad [\text{Eq. 2}]$$

In the above equation, $z/(x+y) \geq 0.65$ and $\alpha = 0.8$ to 0.9 hold.

Cr is crystallized in the form of an AlCrSi phase, and Cr which is not crystallized is precipitated to suppress recrystallization. By this effect of suppressing recrystallization, the size of crystal grains can be decreased even after plastic working, and as a result, the effect of improving the toughness and the corrosion resistance of a final product can be obtained. When the content of Cr is less than 0.1 percent by mass, the effect as described above may be decreased in some cases. On the other hand, when the content of Cr is more than 0.2 percent by mass, a giant intermetallic compound is generated, and the ingot texture of the present invention may not be satisfied in some cases. Hence, the content of Cr is preferably set to a range of 0.11 to 0.19 percent by mass.

Fe is crystallized by bonding to Al and Si in the alloy and prevents the formation of coarse and large crystal grains. When the content of Fe is less than 0.2 percent by mass, the effect as described above may not be obtained in some cases. In addition, when the content of Fe is more than 0.3 percent by mass, a coarse and large intermetallic compound is liable to be generated, and the plastic workability may be degraded in some cases. Hence, the content of Fe is preferably set to a range of 0.2 to 0.3 percent by mass.

Zn is handled as an impurity. When the content of Zn is more than 0.25 percent by mass, corrosion of aluminum itself is promoted, and the corrosion resistance is degraded; hence, the content is preferably set to 0.25 percent by mass or less.

Zr is handled as an impurity. When the content of Zr is more than 0.05 percent by mass, the effect of decreasing the size of crystal grains of an Al—Ti—B-based alloy is decreased, and a decrease in strength of a worked article after plastic working occurs; hence, the content is preferably set to 0.05 percent by mass or less.

Ti is an alloy element which is effective to decrease the size of crystal grains. Furthermore, Ti can prevent the generation of ingot cracking and the like in a continuous casting rod. When the content of Ti is less than 0.012 percent by mass, the effect of decreasing the size may not be obtained in some cases. On the other hand, when the content of Ti is more than 0.035 percent by mass, a coarse and large Ti compound is crystallized, and the toughness may be degraded in some cases. Hence, the content of Ti is preferably set to a range of 0.012 to 0.035 percent by mass.

As is the case of Ti, B is also an element which is effective to decrease the size of crystal grains. When the content of B is less than 0.0001 percent by mass, the effect of decreasing the size may not be obtained in some cases. On the other hand, when the content of B is more than 0.03 percent by mass, the toughness may be degraded in some cases. Hence, the content of B is preferably set to a range of 0.0001 to 0.03 percent by mass.

The aluminum alloy plastic worked article according to the present invention has the shape of the rib portions 21 and the thinned portion 22 defined by $z/(x+y) \geq 0.65$ (where x represents the width direction length (cm) of the rib portion 21, y represents the height direction length (cm) of the thinned portion 22, and z represents the height direction length (cm) of the rib portion 21. See FIGS. 2(a) and (b)), and the composition of each element forming the alloy is specified in the predetermined range described above.

That is, the present invention is an aluminum alloy plastic worked article including the rib portions 21 and the thinned portion 22, and the shape of the rib portions 21 and the thinned portion 22 thereof is defined by z/(x+y)≥0.65 (where x represents the width direction length (cm) of the rib portion 21, y represents the height direction length (cm) of the thinned portion 22, and z represents the height direction length (cm) of the rib portion 21. See FIGS. 2(a) and (b)). In addition, in the present invention, the composition of each element forming the alloy which is specified in the predetermined range as described above is the technical scope of the patented invention.

In the case described above, there can be obtained an aluminum alloy plastic worked article according to the present invention in which the strain portion 23 is formed of the non-recrystalline texture N and the fine crystalline texture M and in which no coarse and large crystalline texture L is recognized. In addition, in the aluminum alloy plastic worked article according to the present invention, preferable performances, that is, a tensile strength of 380 MPa or more, a 0.2%-proof stress of 350 MPa or more, and an elongation of 10.0% or more, can be obtained. In addition, when immersion is performed in a predetermined corrosive liquid, cracks and the like generated thereby are not recognized, and hence, the corrosion resistance is excellent.

The aluminum alloy plastic worked article according to the present invention is preferably applied to structural materials of vehicles and transport apparatuses. For example, there may be mentioned automobile components, two-wheeled motor vehicle components, ship/boat components, aircraft components, and vehicle components of an electric train and a cargo.

Furthermore, as the automobile component of the aluminum alloy plastic worked article, for example, an upper arm, a lower arm, a knuckle, a control arm, a lower link, a subframe, a compression rod, and a transverse link may be mentioned. In those components, the shape of a portion corresponding to the rib portions and the thinned portion and having an approximately H shape or U shape satisfies the equation represented by z/(x+y)≥0.65 (where x represents the width direction length (cm) of the rib portion 21, y represents the height direction length (cm) of the thinned portion 22, and z represents the height direction length (cm) of the rib portion 21. See FIGS. 2(a) and (b)).

In addition, although the components mentioned above may be entirely manufactured from the aluminum alloy plastic worked article according to the present invention, when the aluminum alloy plastic worked article according to the present invention is used in combination with another member or is bonded thereto, manufacturing of the component can be performed. That is, the aluminum alloy plastic worked article according to the present invention may also be used as a part of the component.

Hereinafter, a preferable method for manufacturing an aluminum alloy plastic worked article according to the present invention will be described.

First, individual elements forming the composition of the aluminum alloy plastic worked article according to the present invention are prepared so that the contents thereof are within the respective ranges, and an aluminum alloy ingot is formed by casting from a molten aluminum alloy. In this case, casting may be performed using any type of melting/casting method, such as a horizontal continuous casting method, a vertical continuous casting method, a continuous casting and rolling method, a semi-continuous casting method (DC casting method), a hot-top casting method, a gas pressure continuous casting method, or a gas pressure hot-top continuous casting method. In order to obtain a sound ingot, casting is preferably performed under conditions in which the casting temperature is 750° C.±50° C. and the casting rate is 240±50 mm/min.

Next, a homogenizing treatment is performed at 470° C. to 540° C. on the ingot thus obtained. The reason for this is that when the homogenizing treatment is performed in this temperature range, the homogenization of the ingot and the dissolution of solute atoms are sufficiently performed, and by a subsequent aging treatment, a required strength can be obtained. The holding time of the homogenizing treatment may be set to 3 to 10 hours.

Plastic working is performed after the homogenizing treatment, and if necessary, machining is performed to have a predetermined size. When the plastic working is a working method in which a heating temperature of the raw material in the working is set to a predetermined range, a related plastic working method may be used.

For example, a working method, such as extruding, forging, or rolling, may be used. In order to improve the strength by suppression of recrystallization of the texture after the working, the heating temperature of the raw material is preferably controlled in a range of [430+plastic working rate (%)]° C. to 550° C. When the temperature is set by introducing the plastic working rate into the condition, the generation of coarse and large recrystallization can be further suppressed, and by the subsequent aging treatment, the strength can be further improved.

In the case of the extruding, the plastic working rate (%) can be defined by [(cross-sectional area receiving deformation)÷(initial cross-sectional area)×100] (%). In the case of upsetting, which is one type of forging, the plastic working rate (%) can be defined by [(deformed height)÷(initial height)×100] (%). In addition, the heating temperature of the raw material of a plastic worked article formed by steps through multiple stages may be calculated by introducing the plastic working rate (%) of the final shape into the conditions of the above equation. The heating temperature of the raw material of a plastic worked article having a complicated shape may be calculated in such a way that after the plastic working rates (%) of individual portions are respectively calculated, the average value thereof is introduced into the condition of the above equation.

After the plastic working is performed, a solution treatment, a water quenching treatment, and an aging treatment are performed. The reason for this is to obtain the strength and the corrosion resistance required in accordance with the application, for example, for structural materials (components) of transport apparatuses, such as vehicles, boats and ships, aircrafts, automobiles, and two-wheeled motor vehicles.

The solution treatment is preferably performed in a range of 520° C. to 560° C. When the solution temperature is less than 520° C., $Mg_2Si$ and the like are not sufficiently solid-soluted, and a required strength may not be obtained in some cases by the subsequent aging treatment. On the other hand, when the solution temperature is more than 560° C., burning (local dissolution) may occur in some cases. In addition, the holding time of the solution treatment may be set to 2 to 6 hours.

The water quenching treatment after the solution treatment is preferably performed under the condition in which the water temperature is set to 70° C. or less. In addition, the water quenching treatment is preferably water cooling. When the water temperature is more than 70° C., the quenching effect may not be obtained, and a required strength may not be obtained in some cases by the subsequent aging treatment.

Next, in accordance with the requirement, the aluminum alloy plastic worked article according to the present invention is further processed by machining, such as cutting, bending, drawing, and/or the like, into structural materials (component) of transport apparatuses, such as vehicles, ships and boars, aircrafts, automobiles, or two-wheeled motor vehicles.

The texture of the aluminum alloy ingot obtained by melting/casting will be described. The size of crystal grain diameters of the ingot has a significant influence on the strength of the aluminum alloy plastic worked article obtained by the plastic working and the subsequent aging treatment. Since the improvement in strength after plastic working may not be obtained when the size of crystal grain diameters of aluminum of the ingot is large, the size of crystal grain diameters is set to preferably 300 μm or less as the average value and more preferably 250 μm or less. In addition, the size of crystal grain diameters of aluminum can be measured, for example, by a section method performed on an optical microscope photo.

The size of DAS (Dendrite Arm Space) of the ingot is required to be set to 40 μm or less as the average value and is preferably set to 20 μm or less. The reason for this is that when the size of DAS is more than 40 μm, the strength of the aluminum alloy plastic worked article obtained by the plastic working and the subsequent aging treatment is decreased. In addition, the size of DAS can be measured, for example, in accordance with "Method of measuring dendrite arm spacing" disclosed in "KEIKINNZOKU (1988), vol. 38, No. 1, p. 45" published by General Incorporated Association of The Japan Institute of Light Metals.

As the crystallized material disclosed in this application including crystallized materials of the ingot, there may be mentioned an AlMnSi phase, a $Mg_2Si$ phase, and a secondary phase containing Fe and Cr, each of which is crystallized at the crystal grain boundaries of aluminum in the form of grains or flakes. When the average grain diameter of the crystallized material is 8 μm or less, since the plastic workability is not influenced, the average grain diameter is required to be set to 8 μm or less and is preferably set to 6.8 μm or less. In addition, the size of the crystallized material can be measured in such a way that for example, after a micro texture is identified by an image analysis apparatus (Luzex: registered trademark) including a microscope, the cross-sectional area of each crystallized material is converted into the circle, and the diameter thereof is regarded as the size of the crystallized material.

Figure 5:
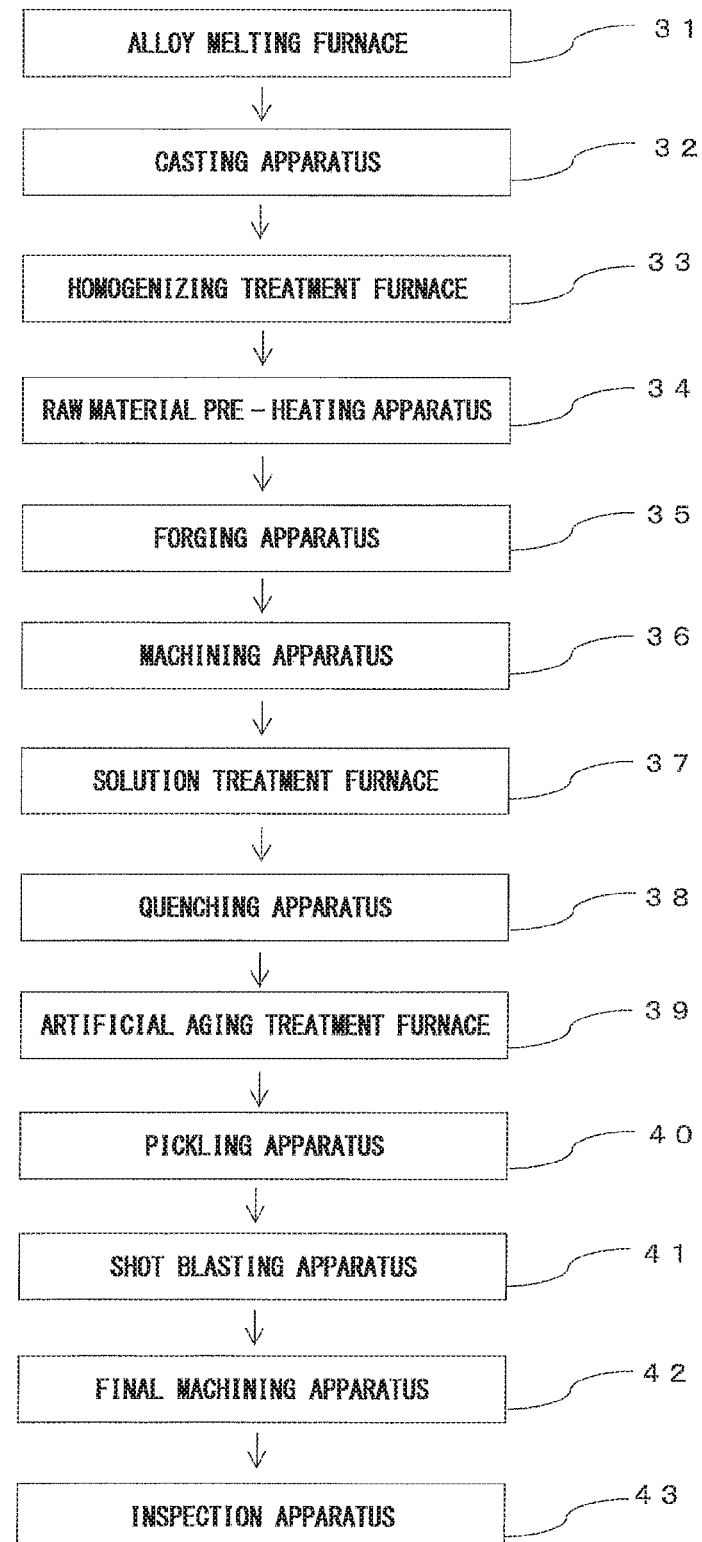
FIG. 5 is a schematic explanation view showing one example of a manufacturing line according to the present invention.
Figure 6A:
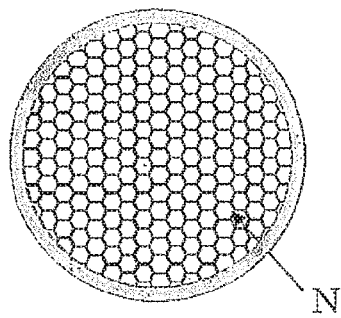
FIGS. 6(a)-6(f) include schematic views each schematically showing the relationship between the intensity of strain amount (equivalent strain) and the texture state in a strain portion of an aluminum alloy plastic worked article (Example 1) according to the present invention.
Figure 6B:
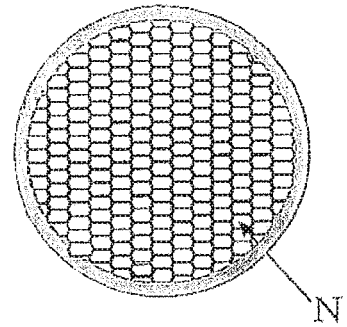
Figure 6C:
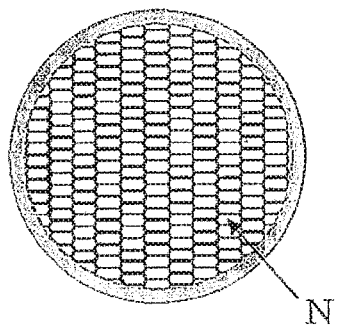
Figure 6D:
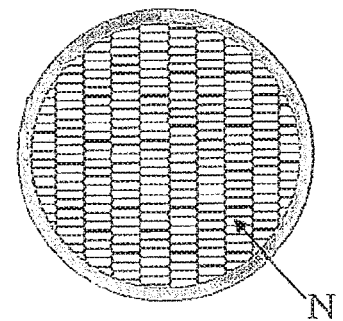
Figure 6E:
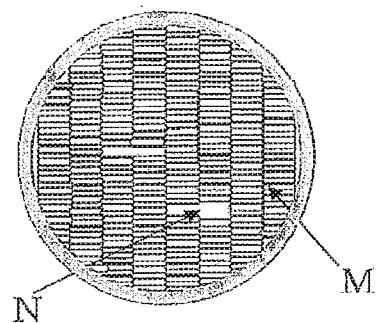
Figure 6F:
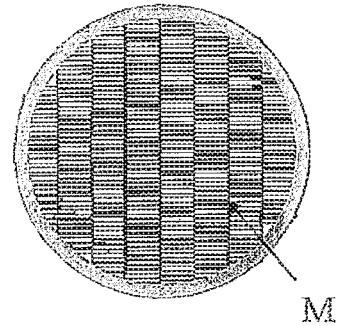
Figure 7A:
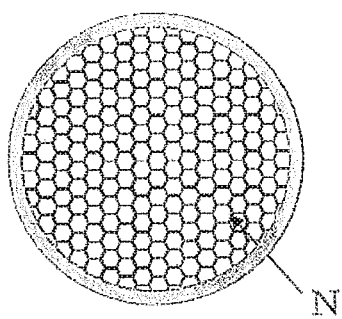
FIGS. 7(a)-7(f) include schematic views each schematically showing the relationship between the intensity of strain amount (equivalent strain) and the texture state in a strain portion of an aluminum alloy plastic worked article (Comparative Example 1) of a related example.
Figure 7B:
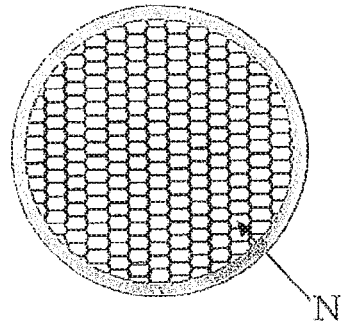
Figure 7C:
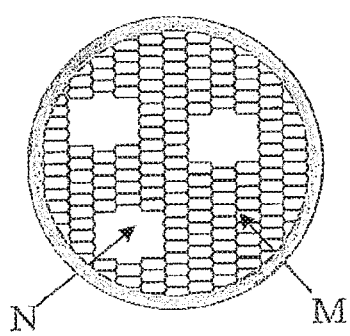
Figure 7D:
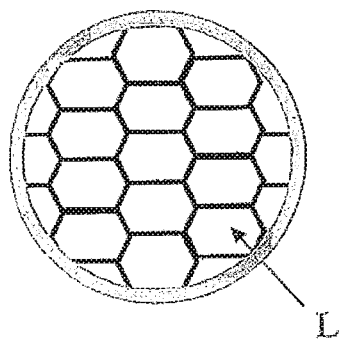
Figure 7E:
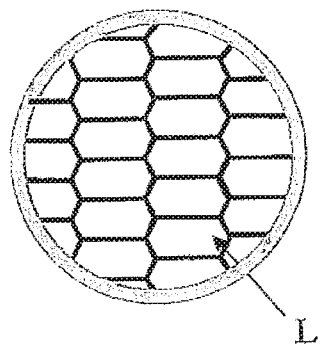
Figure 7F:
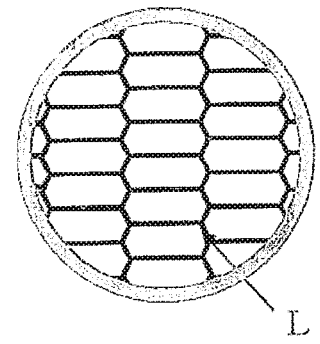
Figure 8A:
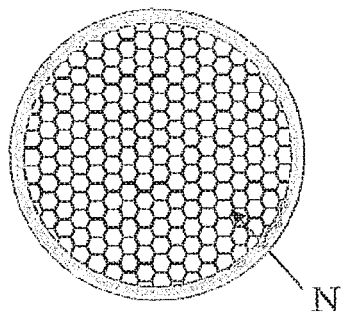
FIGS. 8(a)-8(f) include schematic views each schematically showing the relationship between the intensity of strain amount (equivalent strain) and the texture state in a strain portion of an aluminum alloy plastic worked article (Comparative Example 2) of a related example.
Figure 8B:
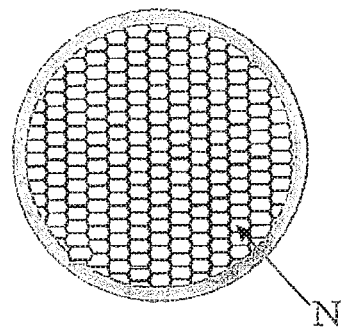
Figure 8C:
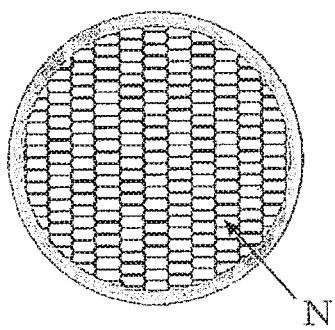
Figure 8D:
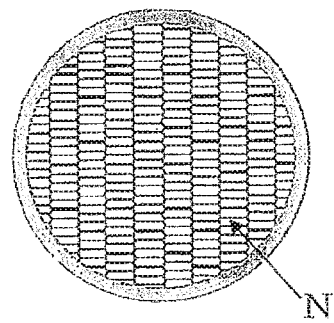
Figure 8E:
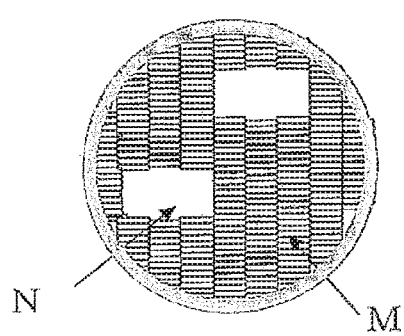
Figure 8F:
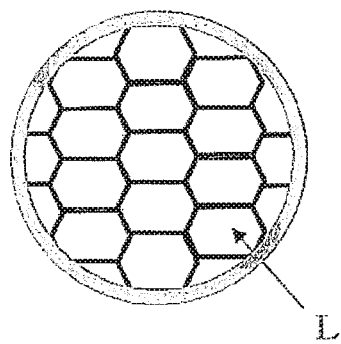

One example of a manufacturing line formed based on a preferable method for manufacturing an aluminum alloy plastic worked article according to the present invention will be described with reference to FIG. 5.

The manufacturing line is formed of an alloy melting furnace 31, a casting apparatus 32, a homogenizing treatment furnace 33, a raw material pre-heating apparatus 34, a forging apparatus 35, a machining apparatus 36, a solution treatment furnace 37, a quenching apparatus 38, an artificial aging treatment furnace 39, a pickling apparatus 40, a shot blasting apparatus 41, a final machining apparatus 42, and an inspection apparatus 43.

The alloy melting furnace 31 is an apparatus which adjusts the alloy composition in its furnace and maintains a molten alloy at a predetermined temperature. The alloy melting furnace 31 may also include a melting holding furnace and a molten metal cleaning apparatus.

The casting apparatus 32 is an apparatus to obtain an ingot by solidifying a molten alloy. The solidification rate can be adjusted by adjusting a cooling ability, such as a cooling water temperature and a cooling water amount.

The homogenizing treatment furnace 33 is an apparatus which performs a homogenizing treatment on an ingot inserted into the furnace. The temperature can be controlled so the inside of the furnace is placed under a predetermined temperature condition.

The ingot is formed into a raw material by appropriate molding, such as extruding, machining, or cutting.

The raw material pre-heating apparatus 34 is an apparatus performing a pre-heating treatment on a molding raw material.

The forging apparatus 35 is an apparatus in which an upper die and a lower die having a molding hole are arranged, an ingot is set in the molding hole as a molding raw material, and plastic working is performed by operating the dies in a vertical direction. If necessary, a lubricant spray device performing a lubricant coating treatment on the molding hole of the die and a lubricant coating treatment on the raw material may be provided.

The machining apparatus 36 is an apparatus performing machining, such as cutting, drilling, and chamfering, on a plastic worked molded article. The machining apparatus 36 may be omitted in some cases depending on the product specification.

The solution treatment furnace 37 is an apparatus performing a solution treatment on the plastic worked molded article. The solution treatment furnace 37 can control the temperature so that the inside of the furnace is placed under a predetermined temperature condition.

The quenching apparatus 38 is an apparatus quenching the molded article in a high temperature state. The molded article is charged into water controlled in a predetermined temperature range for quenching.

The artificial aging treatment furnace 39 is an apparatus performing an aging treatment and can control the temperature so that the inside of the furnace is placed under a predetermined temperature condition.

The picking apparatus 40 is an apparatus performing cleaning on the molded article with an acid solution. Depending on the product specification, the picking apparatus 40 may be omitted in some cases.

The shot blasting apparatus 41 is an apparatus performing a shot blasting treatment on the surface of the molded article. Depending on the product specification, the shot blasting apparatus 41 may be omitted in some cases.

The final machining apparatus 42 is an apparatus performing machining, such as cutting, drilling, or chamfering, so that the molded article is formed to have a final shape. In addition, the final machining apparatus 42 is an apparatus in which another member is used in combination with the molded article or is bonded thereto to obtain the shape of a final product. Depending on the product specification, the final machining apparatus 42 may be omitted in some cases.

The inspection apparatus 43 is an apparatus performing appearance inspection and, if necessary, weight inspection or the like. Depending on the case, direct human visual inspection may be performed.

The apparatuses described above are preferably connected to each other by a carrier apparatus, such as a conveyor or a transport vehicle.

EXAMPLES

Next, Examples of the present invention will be described.

In the following [Table 1], there are shown the composition; the cross-sectional shape of the plastic worked portion; and the width direction length x (cm) of the rib portion, the height direction length y (cm) of the thinned portion, and the height direction length z (cm) of the rib portion, which define the shape of the rib portions and the thinned portion, of each of an aluminum alloy plastic worked article (Comparative Example 1) formed from an A6000 series aluminum alloy, related aluminum alloy plastic worked articles (Comparative Examples 2 and 3) possessed by the applicant, and aluminum alloy plastic worked articles (Examples 1, 2, and 3) according to the present invention.

TABLE 1

|  | Cu | Mg | Si | Mn | Fe |
|---|---|---|---|---|---|
| Comparative Example 1 | 0.33 | 1.05 | 0.70 | 0.12 | 0.25 |
| Comparative Example 2 | 0.40 | 1.00 | 0.82 | 0.20 | 0.25 |
| Comparative Example 3 | 0.33 | 0.98 | 1.05 | 0.50 | 0.25 |
| Example 1 | 0.33 | 0.98 | 1.05 | 0.50 | 0.25 |
| Example 2 | 0.42 | 0.86 | 1.11 | 0.50 | 0.26 |
| Example 3 | 0.41 | 0.87 | 1.09 | 0.41 | 0.25 |

|  | Cr | Zn | Zr | Ti | B |
|---|---|---|---|---|---|
| Comparative Example 1 | 0.25 | 0.01 | 0.000 | 0.015 | 0.003 |
| Comparative Example 2 | 0.20 | 0.01 | 0.000 | 0.015 | 0.003 |
| Comparative Example 3 | 0.15 | 0.01 | 0.000 | 0.015 | 0.003 |
| Example 1 | 0.15 | 0.01 | 0.000 | 0.015 | 0.003 |
| Example 2 | 0.16 | 0.01 | 0.000 | 0.015 | 0.003 |
| Example 3 | 0.15 | 0.01 | 0.000 | 0.015 | 0.003 |

|  | Cross-sectional shape | x | y | z |
|---|---|---|---|---|
| Comparative Example 1 | Approximately H | 14 | 14 | 18 |
| Comparative Example 2 | Approximately H | 7 | 24 | 30 |
| Comparative Example 3 | Approximately H | 14 | 14 | 18 |
| Example 1 | Approximately H | 8 | 7 | 15 |
| Example 2 | Approximately U | 8 | 7 | 15 |
| Example 3 | Approximately H | 18 | 5 | 15 |

As Comparative Examples 1 to 3 and Examples 1 to 3, aluminum alloy ingots having the chemical component compositions shown in Table 1 were casted by a hot-top casting method under the conditions in which the casting temperature was set to 750° C.±50° C. and the casting rate was set to 240±50 mm/min. A homogenizing treatment was performed at 470° C. (holding time: 6 hours) on the ingot formed by this casting. Subsequently, the ingot processed by the homogenizing treatment was heated to 530° C., and by hot forging, plastic working was performed so as to obtain the shape (linear arm) of a suspension arm of an automobile as shown in FIGS. 1(a) and 1(b). In addition, the plastic working rate was 50%. Next, after a solution treatment was performed on this plastic worked article at 530° C. (holding time: 4 hours), and water quenching was performed at 60° C., an aging treatment was performed at 180° C. (holding time in a range of 2 to 15 hours) or at 200° C. (holding time in a range of 0.5 to 12 hours).

In addition, by the plastic working at a working rate of 50% and the subsequent solution treatment at 530° C., it is believed that in the ingot of each of Examples and Comparative Examples, an equivalent strain of 1.33 mm/mm is present in the strain portion.

From the aluminum alloy plastic worked article of each of Comparative Examples 1 to 3 and Examples 1 to 3, a JIS14A proportional test piece (see JIS 22201) was taken, and the tensile strength was measured.

In addition, micro-texture observation by an optical microscope (frontal lighting) was performed on the cross section of a portion from which the tensile test piece was taken, and the average grain diameter of a crystallized material was measured. In a method for measuring the average grain diameter of a crystallized material, the average grain diameter was measured by an image analysis apparatus (Luzex: registered trademark) based on the assumption in that the crystallized material had a circle equivalent diameter. Subsequently, after the surface thus observed was corroded by an etching solution, the micro-texture observation was performed using a polarization microscope, and the crystal grain diameter of aluminum was measured.

Furthermore, from the suspension arm component of each of Comparative Examples 1 to 3 and Examples 1 to 3 formed by the procedure described above, a test piece having a size of 2 mm×4.3 mm×42.4 mm was cut away, and a stress corresponding to 90% of the proof stress was applied to a central portion of a surface having a size of 4.3 mm×42.4 mm using a three-point bending tool. When the stress was applied, the test piece was electrically insulated from the tool. A solution maintained at 95° C. to 100° C. in which 36 g of chromium oxide (IV), 30 g of potassium dichromate, and 3 g of sodium chloride were dissolved in 1 liter of purified water was prepared as a corrosive solution. After the test piece to which the stress was applied was immersed in this corrosive solution for 16 hours, the appearance of the test piece was observed to confirm whether cracks were generated therein or not, and a test piece in which a crack was generated was evaluated as having a low corrosion resistance.

An evaluation table including the mechanical characteristics (the tensile strength, the 0.2%-proof stress, and the elongation), the crystal grain diameter of the crystallized material, the corrosion resistance, and the comprehensive judgment of each of Comparative Examples 1 to 3 and Examples 1 to 3 is shown in the following [Table 2]. In addition, the definition of the symbols (○, Δ, x) in the evaluation columns is as follows.

For judgment of the corrosion resistance, in the test of n=3, the case in which no cracks were generated in the three was ranked as ○, the case in which cracks were observed in one to two out of the three was ranked as Δ, and the case in which cracks were observed in all the three was ranked as x.

For judgment of the mechanical characteristics, the case in which all the characteristics, that is, a tensile strength of 380 MPa or more, a 0.2%-proof stress of 350 MPa or more, and an elongation of 10.0% or more, were satisfied was ranked as ○, the case in which one or two of the above characteristics were not satisfied was ranked as Δ, and the case in which all the characteristics were not satisfied was ranked as x.

As the comprehensive judgment, the case in which the corrosion resistance and the mechanical characteristics were both ranked as ○ was ranked as ○, the case in which one of the corrosion resistance and the mechanical characteristics was ranked as ○, and the other is ranked as Δ was ranked as Δ, and the case in which the corrosion resistance and the mechanical characteristics were both ranked as Δ, the case in which one of them was ranked as x, and the case in which both of them were ranked as x were each ranked as x.

within the predetermined range as described above, the shape of the rib portions and the thinned portion did not satisfy the condition of z/(x+y)≥0.65, the corrosion resistance was good since the corrosion amount was small, the average grain diameter of the crystal grains was also approximately 50 μm, and no coarse and large recrystalline texture was recognized. However, since the tensile strength was 392 MPa, the 0.2%-proof stress was 332 MPa, and the

TABLE 2

|  | Tensile strength (MPa) | 0.2%-proof stress (MPa) | Elongation (%) | Crystal grain diameter (μm) | Corrosion resistance | Mechanical characteristics | Comprehensive judgment |
|---|---|---|---|---|---|---|---|
| Comparative Example 1 | 336 | 308 | 17.0 | 450 | Δ | Δ | X |
| Comparative Example 2 | 367 | 320 | 18.0 | 46 | ○ | Δ | Δ |
| Comparative Example 3 | 392 | 332 | 10.5 | 48 | ○ | Δ | Δ |
| Example 1 | 397 | 363 | 14.9 | 53 | ○ | ○ | ○ |
| Example 2 | 410 | 372 | 14.7 | 49 | ○ | ○ | ○ |
| Example 3 | 395 | 354 | 18.5 | 49 | ○ | ○ | ○ |

As shown in Examples 1 to 3, in the aluminum alloy plastic worked article in which the composition of each element forming the alloy was within the predetermined range as described above, and the shape of the rib portions and the thinned portion satisfied the condition of z/(x+y) ≥0.65, preferable performances, that is, a tensile strength of 380 MPa or more, a 0.2%-proof stress of 350 MPa or more, and an elongation of 10.0% or more (in particular 14.0% or more), could be obtained. In addition, it was found that the crystal grains had an average grain diameter of approximately 50 μm and were formed of a non-recrystalline texture or a fine crystalline texture of aluminum.

On the other hand, in Comparative Example 1 in which the composition of any one of the elements forming the alloy was out of the predetermined range as described above, and the shape of the rib portions and the thinned portion did not satisfy the condition of z/(x+y)≥0.65, the tensile strength was 336 MPa, the 0.2%-proof stress was 308 MPa, and the elongation was 17.2%. The average grain diameter of the crystal grains was also approximately 450 μm, and it was found that depending on the working rate of the plastic working and the conditions of the subsequent solution treatment, for example, when the equivalent strain in the rib portion and the thinned portion was more than 2.00 mm/mm, a coarse and large recrystalline texture was exhibited (in addition, also see FIGS. 7(a)-7(f)). The corrosion amount was large, and hence, the corrosion resistance could not be regarded as good.

In Comparative Example 2 in which although the shape of the rib portions and the thinned portion satisfied the condition of z/(x+y)≥0.65, the composition of any one of elements forming the alloy was out of the predetermined range as described above, the corrosion resistance was good since the corrosion amount was small, the average grain diameter of the crystal grains was also approximately 50 μm, and no coarse and large recrystalline texture was recognized. However, since the tensile strength was 367 MPa, the 0.2%-proof stress was 320 MPa, and the elongation was 18.0%, it could not be regarded that all the mechanical characteristics expected by the applicant of the present application were satisfied.

In addition, in Comparative Example 3 in which although the composition of each element forming the alloy was elongation was 10.5%, it could not be regarded that all the mechanical characteristics expected by the applicant of the present application were satisfied.

In addition, in FIGS. 6 to 8, as for the strain portions in Comparative Examples 1 and 2 and Example 1, the relationship between the intensity of the equivalent strain and the texture state is schematically shown, and those drawings will be described below. In those drawings, the texture states of the strain portions of the aluminum alloy plastic worked article are schematically shown in (a) at an equivalent strain of 0 mm/mm, (b) at an equivalent strain of 0.67 mm/mm, (c) at an equivalent strain of 1.25 mm/mm, (d) at an equivalent strain of 2.00 mm/mm, (e) at an equivalent strain of 2.75 mm/mm, and (f) at an equivalent strain of 3.5 mm/mm.

As shown in FIGS. 6(a)-6(f), when the equivalent strain is up to 2.0 mm/mm, the strain portion in Example 1 is only formed of the non-recrystalline texture N. When the equivalent strain is 2.75 mm/mm, the strain portion is formed to have a texture state containing the non-recrystalline texture N and some of the fine crystalline texture M. In addition, it is found that even when the equivalent strain is 3.5 mm/mm, the strain portion is formed of the fine crystalline texture M. Hence, it is understood that when the equivalent strain is in a range of 0 to 4.0 mm/mm, in particular, in a range of 0 to 3.5 mm/mm, the coarse and large recrystalline texture L is not recognized.

On the other hand, as shown in FIGS. 7(a)-7(f), in the strain portion in Comparative Example 1, the coarse and large recrystalline texture L was unfortunately recognized when the equivalent strain was 2.0 mm/mm. As shown in FIGS. 8(a)-8(f), also in the strain portion in Comparative Example 2, the coarse and large recrystalline texture L was unfortunately recognized when the equivalent strain was 3.5 mm/mm.

Figure 9:
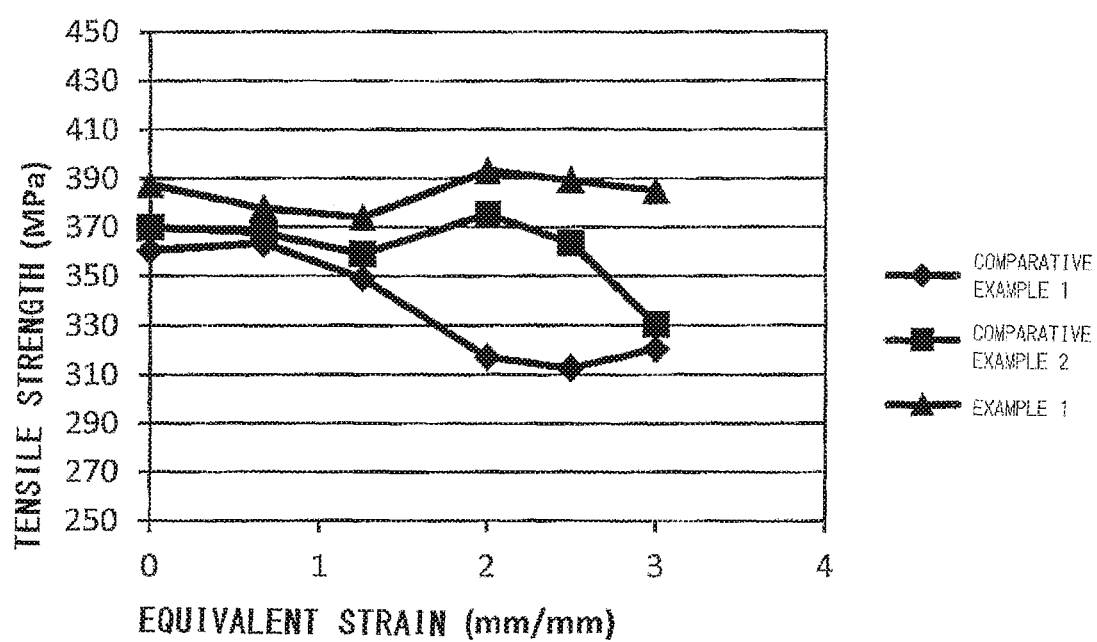
FIG. 9 is a graph showing the relationship between the intensity of strain amount (equivalent strain) and the tensile strength in the strain portion of each of Example 1, Comparative Example 1, and Comparative Example 2 for comparison purpose.

In addition, a graph is shown in FIG. 9 so that the relationship between the intensity of the equivalent strain in the strain portion and the tensile strength can be compared among Example 1, Comparative Example 1, and Comparative Example 2. As understood from this graph, it is found that unlike Comparative Examples 1 and 2, the aluminum alloy plastic worked article of Example 1 is excellent since even when the intensity of the equivalent strain of the strain portion is increased, the strength of the tensile strength thereof is maintained. In particular, when the equivalent strain is approximately 1 to 3 mm/mm which is frequently recognized in a suspension arm used as an automobile component, it is recognized that the tensile strength of Example 1 is significantly excellent as compared to that of Comparative Examples 1 and 2.

Figure 10:
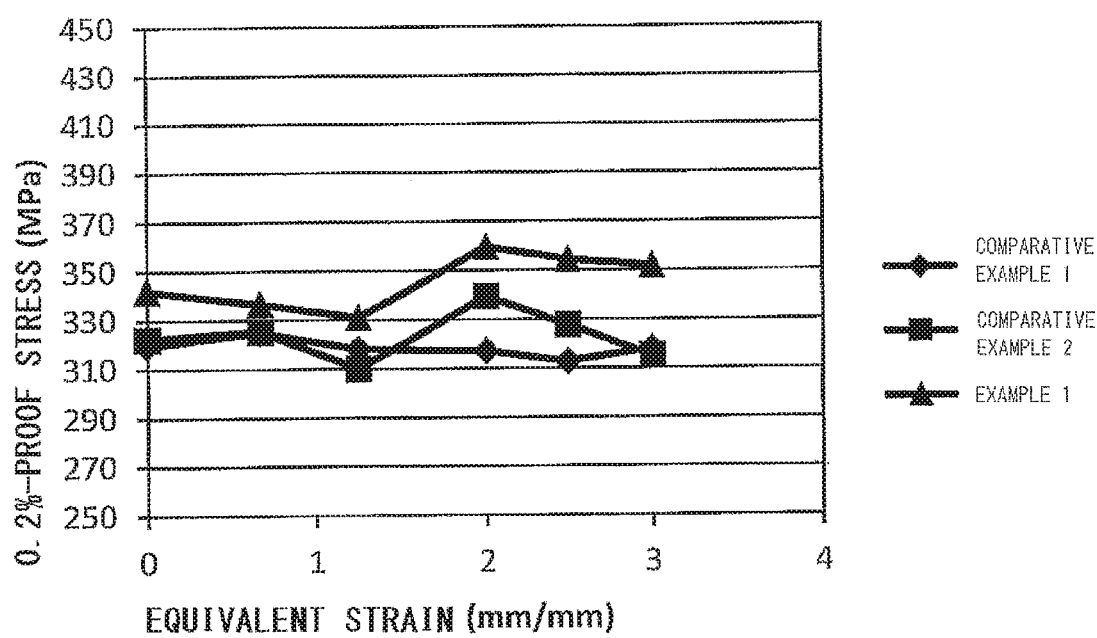
FIG. 10 is a graph showing the relationship between the intensity of strain amount (equivalent strain) and the 0.2%-proof stress in the strain portion of each of Example 1, Comparative Example 1, and Comparative Example 2 for comparison purpose.

A graph is shown in FIG. 10 so that the relationship between the intensity of the equivalent strain in the strain portion and the 0.2%-proof stress can be compared among Example 1, Comparative Example 1, and Comparative Example 2. As understood from this graph, it is found that unlike Comparative Examples 1 and 2, the aluminum alloy plastic worked article of Example 1 is excellent since even when the equivalent strain of the strain portion is increased, the value of the 0.2%-proof stress thereof is maintained. In particular, when the equivalent strain is approximately 1 to 3 mm/mm which is frequently recognized in a suspension arm used as an automobile component, it is recognized that the 0.2%-proof stress of Example 1 is significantly excellent as compared to that of Comparative Examples 1 and 2.

Figure 11:
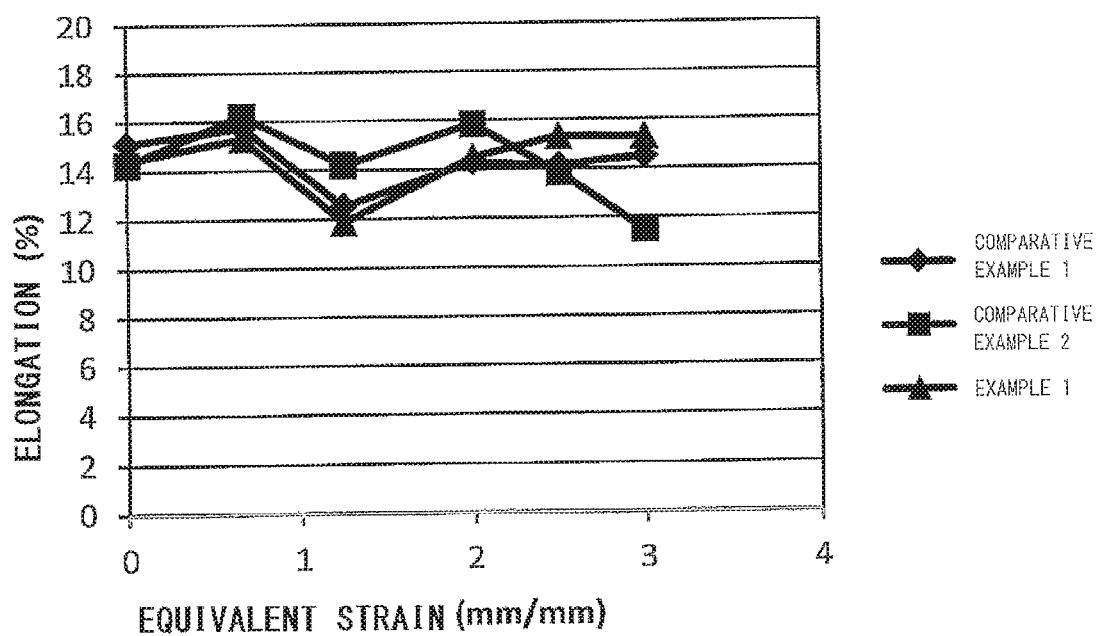
FIG. 11 is a graph showing the relationship between the intensity of strain amount (equivalent strain) and the elongation (%) in the strain portion of each of Example 1, Comparative Example 1, and Comparative Example 2 for comparison purpose.

FIG. 11 is a graph showing the relationship between the intensity of the equivalent strain in the strain portion and the elongation of each of Example 1, Comparative Example 1, and Comparative Example 2. As understood from this graph, it is found that the aluminum alloy plastic worked article of Example 1 is approximately the same level as that of Comparative Examples 1 and 2 and is excellent in terms of the elongation (%) even when the equivalent strain of the strain portion is increased.

Hence, in the aluminum alloy plastic worked article according to the present invention, even when a solution treatment is performed after a working strain is applied by plastic working, the strain portion is formed of a non-recrystalline texture and a fine crystalline texture, and a preferable texture state of aluminum in which no coarse and large crystalline texture is recognized is formed and maintained. The aluminum alloy plastic worked article according to the present invention can obtain preferable performances, that is, a tensile strength of 380 MPa or more, a 0.2%-proof stress of 350 MPa or more, and an elongation of 10.0% or more. As a result, since the strength is increased, the corrosion resistance is improved, and the reduction in thickness can be performed, a required alloy amount can be reduced, and the reduction in weight can be reliably achieved. The range of application of an Al—Mg—Si-based aluminum alloy plastic worked article can be expanded in such a way that, for example, the above aluminum alloy plastic worked article is preferably employed as an automobile component for a transport apparatus application in which the reduction in weight is aggressively pursued, and the range of application of the aluminum alloy plastic worked article can be further expanded.

REFERENCE SIGNS LIST 11 linear arm
12 A arm
2 plastic worked portion
21 rib portion
22 thinned portion
23 strain portion
2a plastic worked portion
21a rib portion
22a thinned portion
N non-recrystalline texture
M fine crystalline texture
L coarse and large recrystalline texture

The invention claimed is:

1. A method for manufacturing an aluminum alloy plastic worked article, the method comprising:

melting an alloy, casting the molten alloy to obtain a cast product, performing a homogenizing treatment on the cast product, after the homogenizing treatment, performing plastic working on the cast product to form a plastic worked article containing a plastic worked portion having a thinned portion, a rib portion is formed at each end of the thinned portion, and strain portions each located at a surface of the plastic worked portion which is at a boundary between the thinned portion and each of the rib portions, and having an H-shaped or U-shaped cross section, performing a solution treatment at a solution treatment temperature of 520° C. to 560° C., a water quenching treatment at a water quenching treatment temperature of 70° C. or less, and an artificial age hardening treatment at an aging treatment temperature of 170° C. to 210° C. for an aging treatment time of 0.5 to 18 hours on the plastic worked article, wherein the aluminum alloy plastic worked article contains 0.15 to 0.5 percent by mass of copper (atomic symbol: Cu), 0.8 to 1.15 percent by mass of magnesium (atomic symbol: Mg), 0.95 to 1.15 percent by mass of silicon (atomic symbol: Si), 0.4 to 0.6 percent by mass of manganese (atomic symbol: Mn), 0.2 to 0.3 percent by mass of iron (atomic symbol: Fe), 0.11 to 0.19 percent by mass of chromium (atomic symbol: Cr), 0.25 percent by mass or less of zinc (atomic symbol: Zn), 0.05 percent by mass or less of zirconium (atomic symbol: Zr), 0.012 to 0.035 percent by mass of titanium (atomic symbol: Ti), 0.0001 to 0.03 percent by mass of boron (atomic symbol: B), and the balance including aluminum and inevitable impurities, a width of the rib portion is represented by x (cm), a height of the thinned portion is represented by y (cm), a height of the rib portion is represented by z (cm), and the content (percent by mass) of the manganese satisfies the following equation [Eq. 1]

$$\text{Manganese (percent by mass)} = 0.4\alpha\{z/(x+y)+0.25\} \quad [\text{Eq. 1}]$$

where $z/(x+y) \geq 0.65$ and $\alpha = 0.8$ to 0.9, the width of the rib portion is perpendicular to the height of the thinned portion and the height of the rib portion, each of the strain portions has an equivalent strain of up to 4.0 mm/mm, and the strain portions are each formed of a non-recrystalline texture of aluminum (atomic symbol: Al) which is not recrystallized or are each formed of the non-recrystalline texture and a fine crystalline texture of the aluminum which is recrystallized but has a crystal grain of 500 μm or less.

2. The method for manufacturing the aluminum alloy plastic worked article according to claim 1, characterized in that the plastic working is performed by at least one type selected from extruding, forging, and rolling.

3. The method for manufacturing the aluminum alloy plastic worked article according to claim 1, characterized in that the aluminum alloy plastic worked article has a tensile strength of 380 MPa or more, a 0.2%-proof stress of 350 MPa or more, and an elongation of 10.0% or more.

* * * * *